US011250138B2

(12) United States Patent
Jones et al.

(10) Patent No.: US 11,250,138 B2
(45) Date of Patent: Feb. 15, 2022

(54) SYSTEMS, METHODS, AND STORAGE MEDIA FOR CALCULATING THE FREQUENCY OF CYBER RISK LOSS WITHIN COMPUTING SYSTEMS

(71) Applicant: RiskLens, Inc., Spokane, WA (US)

(72) Inventors: Jack Allen Jones, Bloomington, IN (US); Justin Nicholas Theriot, Mandeville, LA (US); Jason Michael Cherry, Spokane, WA (US)

(73) Assignee: Risklens, Inc., Spokane, WA (US)

( * ) Notice: Subject to any disclaimer, the term of this patent is extended or adjusted under 35 U.S.C. 154(b) by 165 days.

(21) Appl. No.: 16/801,206

(22) Filed: Feb. 26, 2020

(65) Prior Publication Data

US 2021/0264034 A1    Aug. 26, 2021

(51) Int. Cl.
  *G06F 21/57*  (2013.01)
  *H04L 29/06*  (2006.01)
(52) U.S. Cl.
  CPC ...... *G06F 21/577* (2013.01); *G06F 2221/034* (2013.01); *H04L 63/1433* (2013.01)
(58) Field of Classification Search
  None
  See application file for complete search history.

(56) References Cited

U.S. PATENT DOCUMENTS

| 7,865,952 B1 * | 1/2011 | Hopwood | H04L 63/1433 |
| | | | 726/22 |
| 2005/0182949 A1 * | 8/2005 | Phillips | H04L 63/1441 |
| | | | 713/189 |

(Continued)

OTHER PUBLICATIONS

Radanliev, P., "Future developments in cyber risk assessment for the internet of things," Computers in Industry, vol. 102, 2018, pp. 14-22, ISSN 0166-3615, https://doi.org/10.1016/j.compind.2018.08.002. (https://www.sciencedirect.com/science/article/pii/S0166361518301817), Elsevier, 2018, retrieved on [Apr. 4, 2021]. Retrieved from the internet <URL: https://www.sciencedirect.com/science/article/pii/S0166361518301817>.

(Continued)

*Primary Examiner* — Fatoumata Traore
(74) *Attorney, Agent, or Firm* — Rimon PC; Marc Kaufman (57) ABSTRACT

Systems, methods, and storage media for determining the probability of cyber risk-related loss within one or more computing systems composed of computing elements are disclosed. Exemplary implementations may: assess vulnerability by determining an exposure window for a computing element based on the number of discrete times within a given time frame where the computing element is in a vulnerable state; determine a frequency of contact of the computing element with threat actors; normalize the exposure window and the frequency of contact; calculate a threat event frequency by dividing the normalized exposure window by the normalized frequency of contact; and repeat the steps for multiple elements. When combined with liability data that describes the loss magnitude implications of these events, organizations can prioritize the elements based on loss exposure and take action to prevent loss exposure.

21 Claims, 3 Drawing Sheets

(56) References Cited

U.S. PATENT DOCUMENTS

| | | | |
|---|---|---|---|
| 2008/0028464 A1* | 1/2008 | Bringle | G06F 21/33 |
| | | | 726/22 |
| 2015/0381649 A1 | 12/2015 | Schultz et al. | |
| 2016/0012235 A1 | 1/2016 | Lee et al. | |
| 2016/0110819 A1 | 4/2016 | Abramowitz | |
| 2017/0214711 A1* | 7/2017 | Arnell | H04L 63/1433 |
| 2018/0027006 A1 | 1/2018 | Zimmermann et al. | |
| 2019/0236661 A1 | 8/2019 | Hogg et al. | |
| 2021/0021629 A1* | 1/2021 | Dani | H04L 63/1433 |

OTHER PUBLICATIONS

International Searching Authority, International Search Report and Written Opinion for International Application No. PCT/US2021/016573 dated Apr. 23, 2021.

\* cited by examiner

SYSTEMS, METHODS, AND STORAGE MEDIA FOR CALCULATING THE FREQUENCY OF CYBER RISK LOSS WITHIN COMPUTING SYSTEMS

FIELD OF THE DISCLOSURE

The present disclosure relates to systems, methods, and storage media for calculating the frequency of cyber risk-related loss within one or more computing systems composed of computing elements, referred to as "assets" herein.

BACKGROUND

The cyber risk landscape is complex and dynamic, and there are limited resources for managing it. The inescapable implication is that organizations have to prioritize the many cyber-related risks they face in order to pragmatically address risks. Once this prioritization has taken place, organizations can evaluate and compare the cost-benefit propositions of the many risk mitigation options that are available. The first step in prioritization requires measuring the frequency of cyber-related loss events.

As an example, a hypothetical enterprise could have a thousand assets within its cyber risk landscape and the vulnerability of these systems is likely evaluated daily using a common scanning technology (e.g., QUALYS™). An asset can be a computing system, an application, a computing environment, or a computing device. Furthermore, imagine that QUALYS reports the existence of 3,457 vulnerabilities in total for these assets on a given day, with a third of those vulnerabilities rated Critical or Very High using the Common Vulnerability Scoring System (CVSS) scoring system, or some derivative thereof.

CVSS is a known mechanism for producing a numerical score reflecting vulnerability severity. The numerical score can then be translated into a qualitative representation (such as low, medium, high, and critical). However, the CVSS model is known to be inaccurate (e.g., it ignores the frequency side of a risk equation, it uses complex math on ordinal scales, etc.), which means these tools are not reliable for determining the frequency of loss from these events. In the absence of being able to prioritize its mitigation efforts based on frequency, the enterprise in this example would be forced to try to remediate over a thousand vulnerable conditions. It is not pragmatic to address these many vulnerabilities in a timely fashion, especially given the highly dynamic nature of a cyber risk threat landscape.

Because empirical data related to loss event frequency (LEF) are often sparse and difficult to come by for most cyber-related loss events, an analyst has to estimate frequency based on a manual decomposition of the underlying factors. This estimate can then be applied within the Factor Analysis of Information Risk (FAIR) model, which is a common ontology and methodology for quantifying and managing cyber risk in financial terms.

Figure 1:
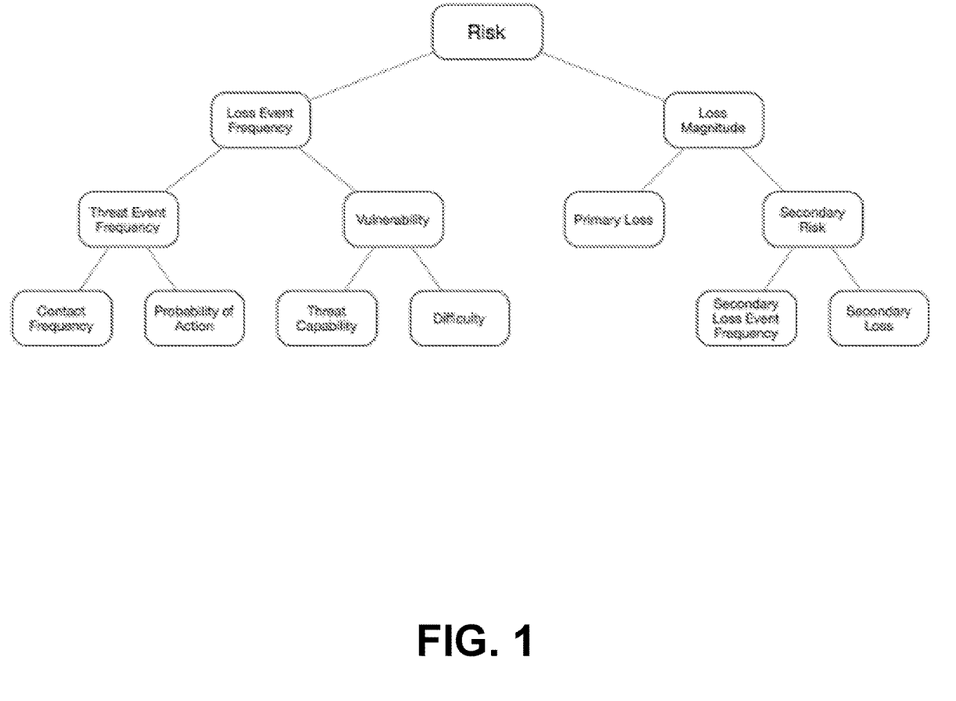
FIG. 1 is a diagram of the FAIR Ontology.

When using the FAIR model, determining LEF boils down to estimating Threat Event Frequency (TEF) and Vulnerability, which further break down into Contact Frequency and Probability of Action (under TEF) and Threat Capability and Difficulty (under Vulnerability). FIG. 1 is a diagram of the relevant portion of the FAIR ontology. However, it is difficult to reliably estimate Threat Capability and Difficulty, which reduces the reliability of some analyses. Furthermore, many organizations must prioritize amongst hundreds or even thousands of vulnerable conditions (e.g., missing software patches), which can't reasonably be accomplished through manual analysis methods. Therefore, the current state of threat analysis methodologies, and thus the current state of addressing cyber threats, is very cumbersome and inefficient.

SUMMARY

One aspect of the present disclosure relates to a system configured for prioritizing cyber risks within one or more computing systems composed of computing elements. The system may include one or more hardware processors configured by machine-readable instructions. The processor(s) may be configured to assess vulnerability by determining an exposure window for a computing element based on the number of discrete times within a given time frame where the computing element is in a vulnerable state. The processor(s) may be configured to determine a frequency of contact of the computing element with threat actors. The processor(s) may be configured to normalize the exposure window and the frequency of contact. The processor(s) may be configured to calculate a LEF by dividing the normalized exposure window by the normalized frequency of contact. The processor(s) may be configured to repeat the above operations for multiple elements. When combined with loss magnitude data (not a part of this disclosure) the processor(s) may be configured to prioritize the elements based on threat loss frequency and, when combined with loss magnitude data and prioritize elements based on loss exposure.

Another aspect of the present disclosure relates to a method for prioritizing cyber risks within one or more computing systems composed of computing elements. The method may include assessing vulnerability by determining an exposure window for a computing element based on the number of discrete times within a given time frame where the computing element is in a vulnerable state. The method may include determining a frequency of contact of the computing element with threat actors. The method may include normalizing the exposure window and the frequency of contact. The method may include calculating a LEF by dividing the normalized exposure window by the normalized frequency of contact. The method may include repeating the above steps for multiple elements. When combined with loss magnitude data the method may include prioritizing the elements based on threat event frequency.

Yet another aspect of the present disclosure relates to a non-transient computer-readable storage medium having instructions embodied thereon, the instructions being executable by one or more processors to perform a method for prioritizing cyber risks within one or more computing systems composed of computing elements. The method may include assessing vulnerability by determining an exposure window for a computing element based on the number of discrete times within a given time frame where the computing element is in a vulnerable state. The method may include determining a frequency of contact of the computing element with threat actors. The method may include normalizing the exposure window and the frequency of contact. The method may include calculating a LEF by dividing the normalized exposure window by the normalized frequency of contact. The method may include repeating above steps for multiple elements. When combined with loss magnitude data the method may include prioritizing the elements based on threat event frequency.

These and other features, and characteristics of the present technology, as well as the methods of operation and functions of the related elements of structure and the combination of parts and economies of manufacture, will become more apparent upon consideration of the following description and the appended Claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the Claims, the singular form of "a", "an", and "the" include plural referents unless the context clearly dictates otherwise.

DETAILED DESCRIPTION

A careful examination of how the threat landscape works shows that we can parse threat actors into two broad communities: 1) threat actors who are opportunists and will attack any vulnerable organization, and 2) threat actors who carefully select their targets based on one or more value-related criteria. The phrase "threat landscape" refers to the array of threats that a particular computing system potentially faces. Opportunist threat actors typically scour the Internet looking for vulnerable conditions that can be exploited (e.g., missing patches, accounts with blank passwords, and the like). Other threat actors carefully select their targets and will continually monitor and probe their target's attack surface area (e.g., Internet-facing systems, applications, end users, and the like) until a vulnerable condition is identified that can be exploited. In both cases, an actual attack (an attempt to exploit) doesn't occur until a vulnerable condition is found that can be exploited.

Given this understanding, we can derive an estimated LEF thru two parameters: 1) the frequency and duration of vulnerable conditions—hereafter referred to as "exposure windows" because they represent a time window of exposure to exploitation by a threat actor; and 2) the frequency of threat agent contact. When combined mathematically (as described below), we can use these two values to derive the probability that a threat agent will come into contact with and exploit a vulnerable condition resulting in a loss event. This provides the basis for an expected LEF.

This concept can be applied as an extension to the FAIR model that eliminates the need to estimate Vulnerability using Threat Capability and Difficulty. Furthermore, the Probability of Action branch in the FAIR model can be simplified by assuming there's a 100% probability of action that threat actors (opportunists and those who are selective) who encounter a vulnerable condition will exploit it. It is common within many organizations to have cybersecurity telemetry sources for these individual parameters (contact frequency, vulnerability frequency and vulnerability duration). However, these values have not been used in the manner described herein to measure the LEF component of an organization's cyber-related loss exposure.

Some examples of such data sources include:
Antivirus technologies
Configuration management tools
Vulnerability scanning tools
Common threat-related data sources
Firewall logs
Intrusion detection and SIEM logs
Application logs The availability of empirical vulnerability and threat data enables data-driven and automated analysis of the LEF component of cyber loss exposure which will improve cyber risk analysis reliability and efficiency. The disclosed implementations provide a way to arrive at a LEF estimate more simply and reliably, and in a manner that can be automated by using empirical data. This, in turn, enables rapid risk-based prioritization of vulnerable conditions. The implementations disclosed herein, eliminate the need to independently estimate Threat Capability and Difficulty, by simplifying the use of security telemetry.

Figure 2:
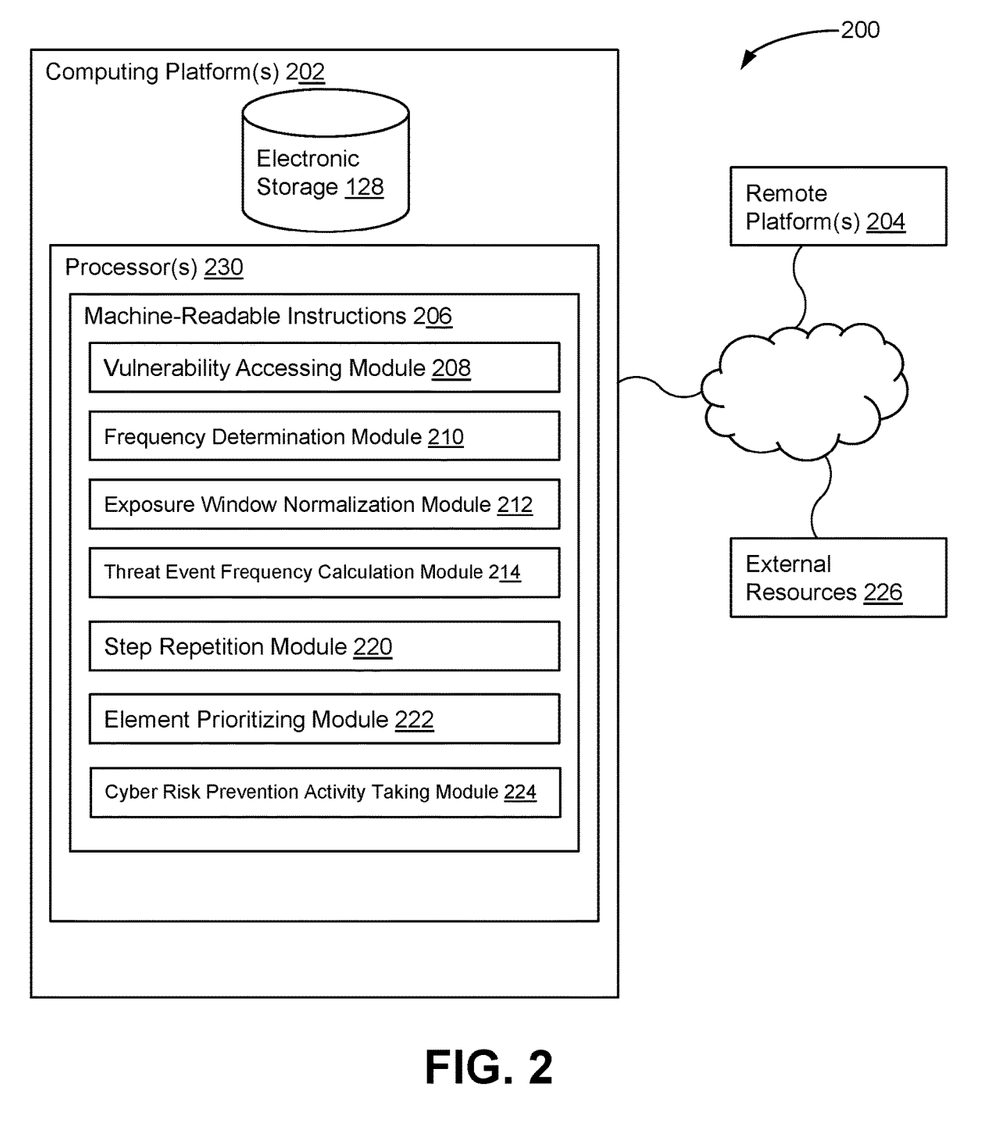
FIG. 2 illustrates a system configured for prioritizing cyber risks within one or more computing systems, in accordance with one or more implementations.

FIG. 2 illustrates a system 200 configured for prioritizing cyber risks within one or more computing systems composed of computing elements, in accordance with one or more implementations. In some implementations, system 200 may include one or more servers 202. Server(s) 202 may be configured to communicate with one or more client computing platforms 204 according to a client/server architecture and/or other architectures. Client computing platform(s) 204 may be configured to communicate with other client computing platforms via server(s) 202 and/or according to a peer-to-peer architecture and/or other architectures. Users may access system 200 via client computing platform(s) 204.

Server(s) 202 may be configured by machine-readable instructions 206. Machine-readable instructions 206 may include one or more instruction modules. The instruction modules may include computer program modules. The instruction modules may include one or more of vulnerability assessing module 208, frequency determination module 210, exposure window normalization module 212, threat event frequency calculation module 214, step repetition module 220, element prioritizing module 222, cyber risk prevention activity taking module 224, and/or other instruction modules.

Vulnerability assessing module 208 may be configured to assess vulnerability by determining an exposure window for a computing element based on the number of discrete times within a given time frame where the computing element is in a vulnerable state. Assessing vulnerability may include using zero-day exploit information to determine the exposure window.

Frequency determination module 210 may be configured to determine a frequency of contact of the computing element with threat actors. The frequency of contact and the LEF are expressed as a range and the calculating loss event frequency may include applying a stochastic process. Determining a frequency may include determining the location of the element within a threat landscape (e.g., is it directly internet-facing or protected within a segregated sub-network) and wherein data indicating the frequency of contact is determined based on the location. In some implementations, assessing vulnerability may include determining between exploitable vulnerable states and non-exploitable vulnerable states and using only exploitable vulnerable states in determining the number of discrete times.

Exposure window normalization module 212 may be configured to normalize the exposure window and the frequency of contact. The normalizing of the exposure window may be accomplished as part of assessing vulnerability and the normalizing of the frequency of contact may be accomplished as part of determining a frequency. The normalizing of the exposure window may include setting the discrete time to a day and setting the given time frame to one year and the normalizing of the frequency of contact by determining a mean time between contact, that is represented by the number of days in a year, and dividing the same by the number of contacts in a year.

Step repetition module 220 may be configured to repeat the above-noted steps for multiple computing assets. Element prioritizing module 222 may be configured to prioritize the assets based on loss exposure. Cyber risk prevention activity taking module 224 may be configured to take cyber risk prevention activities based on the prioritization of assets.

In some implementations, server(s) 202, client computing platform(s) 204, and/or external resources 226 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 202, client computing platform(s) 204, and/or external resources 226 may be operatively linked via some other communication media.

A given client computing platform 204 may include one or more processors configured to execute computer program modules. The computer program modules may be configured to enable an expert or user associated with the given client computing platform 204 to interface with system 200 and/or external resources 226, and/or provide other functionality attributed herein to client computing platform(s) 204. By way of non-limiting example, the given client computing platform 204 may include one or more of a desktop computer, a laptop computer, a handheld computer, a tablet computing platform, a NetBook, a Smartphone, a gaming console, and/or other computing platforms.

External resources 226 may include sources of information outside of system 200, external entities participating with system 200, and/or other resources. In some implementations, some or all of the functionality attributed herein to external resources 226 may be provided by resources included in system 200.

Server(s) 202 may include electronic storage 228, one or more processors 230, and/or other components. Server(s) 202 may include communication lines, or ports to enable the exchange of information with a network and/or other computing platforms. Illustration of server(s) 202 in FIG. 2 is not intended to be limiting. Server(s) 202 may include a plurality of hardware, software, and/or firmware components operating together to provide the functionality attributed herein to server(s) 202. For example, server(s) 202 may be implemented by a cloud of computing platforms operating together as server(s) 202.

Electronic storage 228 may comprise non-transitory storage media that electronically stores information. The electronic storage media of electronic storage 228 may include one or both of system storage that is provided integrally (i.e., substantially non-removable) with server(s) 202 and/or removable storage that is removably connectable to server(s) 202 via, for example, a port (e.g., a USB port, a firewire port, etc.) or a drive (e.g., a disk drive, etc.). Electronic storage 228 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 228 may include one or more virtual storage resources (e.g., cloud storage, a virtual private network, and/or other virtual storage resources). Electronic storage 228 may store software algorithms, information determined by processor(s) 230, information received from server(s) 202, information received from client computing platform(s) 204, and/or other information that enables server(s) 202 to function as described herein.

Processor(s) 230 may be configured to provide information processing capabilities in server(s) 202. As such, processor(s) 230 may include one or more of a digital processor, an analog processor, a digital circuit designed to process information, an analog circuit designed to process information, a state machine, and/or other mechanisms for electronically processing information. Although processor(s) 230 is shown in FIG. 2 as a single entity, this is for illustrative purposes only. In some implementations, processor(s) 230 may include a plurality of processing units. These processing units may be physically located within the same device, or processor(s) 230 may represent processing functionality of a plurality of devices operating in coordination. Processor(s) 230 may be configured to execute the modules and/or other modules. by software; hardware; firmware; some combination of software, hardware, and/or firmware; and/or other mechanisms for configuring processing capabilities on processor(s) 230. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules are illustrated in FIG. 2 as being implemented within a single processing unit, in implementations in which processor(s) 230 includes multiple processing units, one or more of the modules may be implemented remotely from the other modules. The description of the functionality provided by the different modules described below is for illustrative purposes, and is not intended to be limiting, as any of the modules may provide more or less functionality than is described. For example, one or more of the modules may be eliminated, and some or all of its functionality may be provided by other ones of the modules. As another example, processor(s) 230 may be configured to execute one or more additional modules that may perform some or all of the functionality attributed below to one of the described modules.

Figure 3:
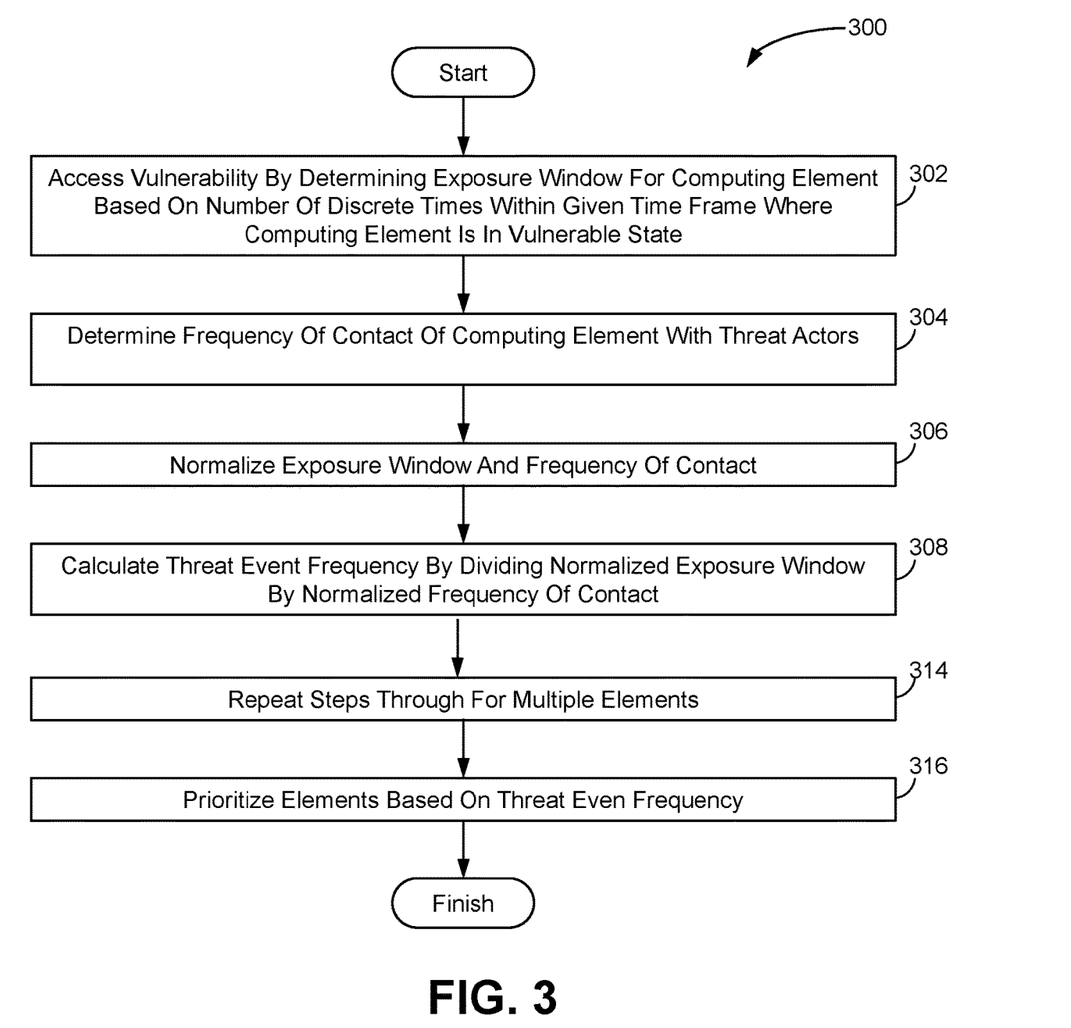
FIG. 3 illustrates a method for prioritizing cyber risks within one or more computing systems, in accordance with one or more implementations.

FIG. 3 illustrates a method 300 for prioritizing cyber risks within one or more computing systems composed of computing elements, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include assessing vulnerability by determining an exposure window for a computing element based on the number of discrete times within a given time frame where the computing element is in a vulnerable state. Operation 302 may be performed by one or more hardware processors configured by machine-readable instructions including a module that is the same as or similar to vulnerability assessing module 208, in accordance with one or more implementations.

An operation 304 may include determining a frequency of contact of the computing element with threat actors. Operation 304 may be performed by one or more hardware processors configured by machine-readable instructions including a module that is the same as or similar to frequency determination module 220, in accordance with one or more implementations.

An operation 306 may include normalizing the exposure window and the frequency of contact. Operation 306 may be performed by one or more hardware processors configured by machine-readable instructions including a module that is the same as or similar to exposure window normalization module 222, in accordance with one or more implementations.

An operation 308 may include calculating a loss event frequency by dividing the normalized exposure window by the normalized frequency of contact. Operation 308 may be performed by one or more hardware processors configured by machine-readable instructions including a module that is the same as or similar to loss event frequency determination module 210, in accordance with one or more implementations.

An operation 314 may include repeating the above-noted operations for multiple assets. Operation 314 may be performed by one or more hardware processors configured by machine-readable instructions including a module that is the same as or similar to step repetition module 220, in accordance with one or more implementations.

An operation 316 may include prioritizing the elements based on threat event frequency and, when combined with loss magnitude data, prioritize elements based on loss exposure. Operation 316 may be performed by one or more hardware processors configured by machine-readable instructions including a module that is the same as or similar to element prioritizing module 222, in accordance with one or more implementations.

The modules and corresponding operations noted above are described in more detail below. Determining the probability in a given year that contact with a threat agent will coincide with an exposure window can include determining how many days in a year where an is in a vulnerable state—i.e., its overall exposure window. This is derived from vulnerability data sources that indicate how often vulnerable conditions occur, and how long they last. For example, if available security telemetry shows that a system on average has three vulnerable condition occurrences per year, and the average duration of those conditions is seven days, then the asset on average has twenty-one days of exposure per year. Note that because the risk landscape is dynamic, the values used in this analysis should be ranges rather than discrete values, and the underlying analytics should leverage a stochastic process, such as a Monte Carlo method, to account for measurement uncertainty.

Determining the mean-time-between-contact (MTBC) with threat actors is derived from system logs that contain evidence of threat scanning/probing. Mathematically, this can be arrived at by dividing the number of days in a year by the frequency of contact (e.g., a Contact Frequency of 5 results in a MTBC of 73 days). LEF can be determined by dividing the Exposure Window by the MTBC. Using the values from the previous two examples yields a LEF of 0.29. In other words, in this example, a loss event occurring a little less than once every three years.

Although the underlying premise and mathematics relied on by the implementation are relatively straight-forward, a practical implementation is much more challenging. The reasons for this include:

Vulnerability-related data tends to be very noisy. In other words, much of the vulnerability data are related to control deficiencies that are not, in fact, exploitable. This means that implementations disclosed herein will differentiate between vulnerabilities that are likely exploitable versus those that aren't.

Cyber-related assets will exist in various threat landscapes with different Contact Frequencies (e.g., Internet-facing versus not Internet-facing). This means that implementations will be able to determine where a system/application/etc. sits within the threat landscape and therefore which Contact Frequency data is applicable.

Because many technologies have some history regarding the frequency of new zero-day exploits that are developed by the various threat communities, implementations will be able to track, analyze, and integrate this data point in determining the frequency of vulnerable conditions.

The threat landscape and controls environment evolve, which means that empirical data may not provide an entirely reliable representation of how the future will unfold. Thus, implementations will be able to capture and extrapolate from trends within the data it applies to an analysis.

The disclosed implementations also allow for subject matter expert adjustment of data. This enables manual "what-if" analyses to examine when and where an organization may be sensitive (or resilient) to changes in either the threat landscape or the controls environment. Implementations allow for automated sensitivity analyses that enable large scale exploration of an organization's cyber risk landscape to rapidly explore the problem space and identify opportunities to optimize mitigation efforts and establish a highly resilient environment. In order to enable loss exposure-based prioritization of vulnerable conditions, a solution using the implementations described herein will also integrate value/liability data that provide the loss magnitude side of a cyber loss exposure (e.g., from asset management databases).

An example use case is described below. Imagine a company called ABC Inc. has a thousand systems within its cyber risk landscape and that the vulnerability of these systems is evaluated on a daily basis using a common scanning technology (e.g., the QUALYS™ Cloud Platform. Furthermore, imagine that QUALYS reports the existence of 3,457 vulnerabilities in total for these systems on a given day, with a third of those vulnerabilities rated Critical or Very High using the CVSS scoring system discussed above. In the absence of being able to prioritize its mitigation efforts based on loss-exposure, ABC Inc. would be forced to try to remediate over a thousand vulnerable conditions. Most organizations are unable to tackle this many vulnerabilities in a timely fashion, especially given the highly dynamic nature of the landscape. This results in the need to either: a) perform time-consuming manual analysis, or b) pick which vulnerabilities to remediate using a nearly random approach. In either case, ABC Inc. incurs longer windows of exposure to loss than is necessary or optimum and threat prevention is sub-optimal at best.

Instead, imagine that ABC Inc. is using the implementations disclosed herein. In order to perform loss-exposure-based analysis of its landscape, the implementations will receive data from the following sources:

- QUALYS data regarding the type of vulnerabilities as well as their frequency and duration for each system (this data enables implementations to determine, for each system, which vulnerabilities are exploitable and the exposure window for each system);
- network IP address data for each system (this data enables implementations to determine which threat landscape(s) each system is exposed to (e.g., Internet-facing, internal only, connected to 3rd parties, etc.) and therefore which Contact Frequency data (in the next bullet) applies to which systems);
- data from threat detection technologies in each of the relevant threat landscapes (e.g., from a Security Information and Event Management (SIEM) provider) which provides empirical data related to Contact Frequency; and
- data from ABC Inc's asset management data base which contains information regarding the value/liability characteristics of each system (This information is used to derive the loss magnitude component of a loss exposure-based analysis).

As a result of this analysis, ABC Inc. is able to determine which systems represent the greatest loss exposure, which in this example boiled down to 50 systems that warrant immediate remediation and 250 that warrant near-term attention. ABC Inc. also ran a sensitivity analysis that identified a dozen systems that would fall into the "immediate remediation" category if a specific change related to those technologies occurred in the threat landscape related (e.g., a new zero-day exploit occurred). Based on this result, these systems are placed at the end of the queue for "immediate remediation". This results in much more effective risk reduction activities.

As noted above, implementations disclosed herein eliminate the need to independently estimate Threat Capability and Difficulty, by simplifying the use of security telemetry within known methodologies such as the FAIR analysis. Described below are examples of mathematical formulas that can be used to achieve the calculations noted above. The implementations disclosed herein can be thought of as an objective, model-based approach to measure LEF. Inputs are processed by the model to measure LEF. A mathematical model is described below through the use of Beta-PERT distributions. All inputs preferably take a minimum value, a most likely value, a maximum value, and a lambda (confidence) value, to create a Beta-PERT distribution, which is described immediately below.

For parameters $a>0$, $b>0$, $c>0$, $\lambda>0$, a probability density function can be calculated by:

$$\Phi_i = f(a, b, c, \lambda) = \frac{(x-a)^{\alpha-1}(c-x)^{\beta-1}}{B(\alpha, \beta)(c-a)^{\alpha+\beta+1}} \quad (8)$$

where i is the distribution type:

$$\alpha = \frac{4b+c-4a}{c-a} \quad (9)$$

and $$\beta = \frac{5c-a-4b}{c-a} \quad (10)$$

The PERT distribution is defined by a minimum value a, most likely value b, and a maximum value c.

Mean:

$$\mu = E[X] = \frac{a + \lambda b + c}{\lambda + 2} \quad (11)$$

Variance:

$$\sigma^2 = \text{Var}[X] = \frac{(\mu - a)(c - \mu)}{\lambda + 3} \quad (12)$$

Skewness:

$$\gamma_1 = \frac{E[(X-\mu)^2]}{\text{var}(X)^{\frac{3}{2}}} = \frac{2(\beta - \alpha)\sqrt{\alpha + \beta + 1}}{(\alpha + \beta + 2)\sqrt{\alpha\beta}} \quad (13)$$

Excess Kurtosis $$\gamma_2 = \frac{\lambda + 2[(\alpha - \beta)^2(\alpha + \beta + 1) - \alpha\beta(\alpha + \beta + 2)]}{\alpha\beta(\alpha + \beta + 2)(\alpha + \beta + 3)} \quad (14)$$

Let $\Phi_i(X)$ be a Beta-PERT distribution based on the function input, where x are the parameters, $a>0$; $b>0$; $c>0$; $\lambda>0$. A more detailed description of the inputs to the calculation model is described below. Note that the units of the values described below (such as days) are merely examples and any convenient units can be uses.

1. Annual Threat Actor Scan Rate—
2. Annual Asset Vulnerability Opening Rate
3. Days of Open Vulnerability—
4. Number of Days Per Year—n A set of intermediate calculations used by the model are described below. We begin, with the likelihood of a vulnerability opening occurring per day as, $$e = \frac{o}{n}.$$

Where, e is the likelihood of a vulnerability opening occurring within a given year, o is the asset vulnerability opening rate over that years, and n is the number days in a given year. We define year as the unit of time, and days as the sub-units of time; this formula is intended to be modular. Based on this we can say the likelihood on any particular sub-unit of time being vulnerable is calculated based on the likelihood of a vulnerability window opening within the number of sub-units that such a window would last as.

$$f_B(\psi) = 1 - (1-e)^d,$$

Where the $f_B$ ($\psi$) the is the Binary Vulnerability Analysis (BVA) function on, $\psi$ vulnerability, e is the likelihood of a vulnerability opening occurring per sub-unit of time and d is the number of sub-unit time the vulnerability is open. We then calculate the likelihood of a threat actor scanning the asset at any given sub-unit of time, $$f_B(\phi) = \frac{\kappa}{n}.$$

Where, $f_B(\phi)$ is the BVA function on contact frequency, k, is the contract frequency over the given unit of time, and n is the number of sub-units in a given unit of time. Now we calculate the likelihood of the asset being vulnerable at the same time that a threat actor scans the asset, which results in a loss event, $$p(\ell) = f_B(\psi) f_B(\phi) \quad \ell \in \mathbb{R} : \ell \in [0,1]$$

Where $p(\ell)$ is the probability, likelihood, of threat actor scanning the asset on a given sub-unit of time, $f_B(\psi)$ is the BVA function on vulnerability, and $f_B(\phi)$ is the BVA function on for contact frequency. We can convert this into the parent timeframe via, $$\Theta = p(\ell) n$$

Where $\Theta$ is our annualized loss event frequency. After a few algebraic transformations, the complete equation is, $$\Theta = \kappa \left(1 - \left(1 - \frac{o}{n}\right)^d\right)$$

The outputs, and example calculations for the outputs, of the model are described below.

1. Loss Event Frequency—$\Theta$

One example takes the current loss event frequency, $\Theta$, and an estimate on the change of frequency, $\hat{f}'$, to calculate the loss event frequency for the next time period, $\Theta$.

$$\Theta' = \begin{cases} \hat{f}' = 0 & \Theta \\ \hat{f}' \neq 0 & \hat{f}' \Theta \\ \not\exists \Theta & \hat{\Theta}' \end{cases} \quad (7)$$

Where $\hat{f}' = [-\infty, \infty]$ is the estimated frequency change. In the case of $\hat{f}'$ being a range, we simply take the average over the range.

$$f'(x) = \frac{1}{n} \sum_{i=1}^{n} x_i \quad (7)$$

When we estimate no change to $\Theta$ for the next time period, $\Theta$ remains the same. In the event of a change in $\Theta$ the estimated change, $\hat{f}'$, can be multiplied by the current $\Theta$. When $\Theta$ does not exist for the current time period, $\Theta'$ can be estimated for the next time period.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended Claims. For example, it is to be understood that the present technology contemplates that, to the extent possible, one or more features of any implementation can be combined with one or more features of any other implementation.

What is claimed is:

1. A system configured for determining the frequency of cyber risk losses within one or more computing systems composed of computing elements, the system comprising:
   one or more hardware processors configured by machine-readable instructions to:
   assess vulnerability by determining an exposure window fora computing element based on the number of discrete times within a given time frame where the computing element is in a vulnerable state;
   determine a frequency of contact of the computing element with threat actors:
   normalize the exposure window and the frequency of contact;
   wherein the normalizing of the exposure window is accomplished as part of assessing vulnerability and comprises setting the discrete time to a day and setting the given time frame to one year and the normalizing of the frequency of contact is accomplished as part of determining a frequency, by determining a mean time between contact that is represented byte number of days in a year by the number of contacts in a year;
   calculate a loss event frequency by dividing the normalized exposure window by the normalized frequency of contact; and
   repeat the operations above for multiple elements.

2. The system of claim 1, wherein the exposure window, the frequency of contact and the loss event frequency are expressed as a range and the calculating loss event frequency includes applying a stochastic process.

3. The system of claim 1, wherein assessing vulnerability comprises determining between exploitable vulnerable states and non-exploitable vulnerable states and using only exploitable vulnerable states in determining the number of discrete times.

4. The system of claim 1, wherein determining a frequency comprises determining the position of the element within a threat landscape and wherein data indicating the frequency of contact is determined based on the position.

5. The system of claim 1, wherein assessing vulnerability comprises using zero-day exploit information to determine the exposure window.

6. The system of claim 1, wherein the one or more hardware processors are further configured by machine-readable instructions to take cyber risk prevention activities based on the prioritization of elements.

7. The system of claim 1, wherein the one or more hardware processors are further configured by machine-readable instructions to combine the determined loss event frequency with loss magnitude data and prioritize elements based on loss exposure.

8. A method for prioritizing cyber risks within one or more computing systems composed of computing elements, the method comprising:
   assessing vulnerability by determining an exposure window fora computing element based on the number of discrete times within a given time frame where the computing element is in a vulnerable state;
   determining a frequency of contact of the computing element with threat actors;
   normalizing the exposure window and the frequency of contact;
   wherein the normalizing of the exposure window is accomplished as part of assessing vulnerability and comprises setting the discrete time to a day and setting the given time frame to one year and the normalizing of the frequency of contact is accomplished as part of determining a frequency, by determining a mean time between contact that is represented by the number of days in a year by the number of contacts in a year;

calculating a loss event frequency by dividing the normalized exposure window by the normalized frequency of contact; and repeating the steps above for multiple elements.

9. The method of claim 8, wherein the exposure window, the frequency of contact and the loss event frequency are expressed as a range and the calculating loss event frequency includes applying a stochastic process.

10. The method of claim 8, wherein assessing vulnerability comprises determining between exploitable vulnerable states and non-exploitable vulnerable states and using only exploitable vulnerable states in determining the number of discrete times.

11. The method of claim 8, wherein determining a frequency comprises determining the position of the element within a threat landscape and wherein data indicating the frequency of contact is determined based on the position.

12. The method of claim 8, wherein assessing vulnerability comprises using zero-day exploit information to determine the exposure window.

13. The method of claim 8, further comprising, taking cyber risk prevention activities based on the prioritization of elements.

14. The method of claim 8, further comprising combining the determined loss event frequency with loss magnitude data and prioritizing elements based on loss exposure.

15. A non-transient computer-readable storage medium having instructions embodied thereon, the instructions being executable by one or more processors to perform a method for prioritizing cyber risks within one or more computing systems composed of computing elements, the method comprising:

assessing vulnerability by determining an exposure window fora computing element based on the number of discrete times within a given time frame where the computing element is in a vulnerable state;

determining a frequency of contact of the computing element with threat actors;

normalizing the exposure window and the frequency of contact;

wherein the normalizing of the exposure window is accomplished as part of assessing vulnerability and comprises setting the discrete time to a day and setting the given time frame to one year and the normalizing of the frequency of contact is accomplished as part of determining a frequency, by determining a mean time between contact that is represented by the number of days in a year by the number of contacts in a year;

calculating a loss event frequency by dividing the normalized exposure window by the normalized frequency of contact; and repeating the operations above for multiple elements.

16. The computer-readable storage medium of claim 15, wherein the exposure window, the frequency of contact and the loss event frequency are expressed as a range and the calculating loss event frequency includes applying a stochastic process.

17. The computer-readable storage medium of claim 15, wherein assessing vulnerability comprises determining between exploitable vulnerable states and non-exploitable vulnerable states and using only exploitable vulnerable states in determining the number of discrete times.

18. The computer-readable storage medium of claim 15, wherein determining a frequency comprises determining the position of the element within a threat landscape and wherein data indicating the frequency of contact is determined based on the position.

19. The computer-readable storage medium of claim 15, wherein assessing vulnerability comprises using zero-day exploit information to determine the exposure window.

20. The computer-readable storage medium of claim 15, wherein the method further comprises, taking cyber risk prevention activities based on the prioritization of elements.

21. The computer-readable storage medium of claim 15, wherein the method further comprises combining the determined loss event frequency with loss magnitude data and prioritizing elements based on loss exposure.

* * * * *